United States Patent [19]

Duruz

[11] Patent Number: 5,004,524
[45] Date of Patent: Apr. 2, 1991

[54] REFRACTORY OXYCOMPOUD/REFRACTORY HARD METAL COMPOSITE AND USED IN MOLTEN SALT ALUMINUM PRODUCTION CELLS

[75] Inventor: Jean-Jacques Duruz, Geneva, Switzerland

[73] Assignee: Moltech Invent S.A., Luxembourg

[21] Appl. No.: 350,478

[22] PCT Filed: Sep. 8, 1988

[86] PCT No.: PCT/EP88/00817
§ 371 Date: Apr. 28, 1989
§ 102(e) Date: Apr. 28, 1989

[87] PCT Pub. No.: WO89/02423
PCT Pub. Date: Mar. 23, 1989

[51] Int. Cl.$^5$ ................................................ C25C 7/00
[52] U.S. Cl. ................................ 204/243 R; 204/279; 204/295; 428/323; 428/328; 428/689; 428/704; 75/305; 75/327

[58] Field of Search ............ 204/67, 243 R, 279, 204/291, 295; 75/235, 244, 230, 252, 228, 229, 305, 327; 428/323, 328, 704, 689; 501/98

[56] References Cited

U.S. PATENT DOCUMENTS 4,600,481 7/1986 Sane et al. ............................ 204/67
4,737,254 4/1988 Gesing et al. .................. 204/243 R

FOREIGN PATENT DOCUMENTS 0095854 8/1987 European Pat. Off. .
84/002723 7/1984 World Int. Prop. O. .

Primary Examiner—John F. Niebling
Assistant Examiner—Kathryn Gorgos
Attorney, Agent, or Firm—John J. Freer

[57] ABSTRACT

A composite material comprises a body, e.g., a slab, of a fused refractory oxycompound (3) having a multiplicity of discrete inclusions such as lumps (1) of an aluminum-wettable RHM in its surface. These bodies are especially useful as aluminum-wettable but non-current carrying components of aluminum reduction cells.

13 Claims, 4 Drawing Sheets

REFRACTORY OXYCOMPOUD/REFRACTORY HARD METAL COMPOSITE AND USED IN MOLTEN SALT ALUMINUM PRODUCTION CELLS

TECHNICAL FIELD

The invention relates to composite materials formed of alumina or other refractory oxycompounds and refractory hard metal (RHM), which are wettable by molten aluminum but which do not need to be electrically non-conductive in applications in which they do not serve for the supply of electric current. The invention also relates to methods of making these composite materials as well as their use as components of aluminum production cells.

BACKGROUND ART

In the production of aluminum, there have been numerous proposals for composite materials based on alumina or other refractory oxycompounds and the so-called Refractory Hard Metals.

In this specification, the term "Refractory Hard Metals" or "RHM" designates the borides and carbides of Groups IVB (Ti, Zr, Hf) and VB (V, Nb, Ta) of the periodic table of the elements. The RHMs contemplated for this invention are aluminum-wettable. Also, "RHM" as used herein includes composites based on RHM and which include sufficient RHM at least at their surface to provide permanent wettability to molten aluminum as well as other materials stable in the presence of molten aluminum and wettable by the molten aluminum.

Conventional Hall-Heroult cells for the electrolytic production of aluminum employ a carbon cell bottom which serves to supply current to a deep pool of molten aluminum forming the cathode. The cathodic aluminum is necessarily thick (at least 80–100 mm) because carbon is non-wettable by molten aluminum. Problems arise because of wave motion in the thick aluminum pool caused by the considerable forces generated by the magnetic fields. The use of RHM to alleviate these problems has been contemplated, but so far has not met with success.

U.S. Pat. Nos. 4,650,552 and 4,600,481 described families of composite materials including conductive alumina-aluminum composites having RHM additives to enhance wettability and electrical conductivity. These materials were mainly intended for use as components such as cathodes and cathode current feeders which serve to supply electrical current to the cell. Considerable development work did not, however, lead to a material which combined electrical conductivity, wettability, resistance to molten aluminum and cryolite and other desirable properties.

U.S. Pat. No. 4,560,448 describes a structural component of an aluminum production cell which is in contact with molten aluminum, made of a non-wettable material such as alumina which is rendered wettable by a thin coating of $TiB_2$. However, to prevent dissolution of this thin (up to 100 micron) coating, the molten aluminum had to be maintained saturated with titanium and boron.

EP-A-0117366 describes the production of a composite refractory cermet material by filtering, e.g. titanium diboride particles in molten aluminum through a porous refractory followed optionally by comminuting into green shapes and firing to form a dense sintered tile. Generally, sintering aids are necessary and sintered bodies are inherently porous leading to attack and grain-boundary corrosion when in contact with molten aluminum.

A dense essentially non-porous titanium diboride-alumina composite material of specific microstructure is described in U.S. Pat. No. 4,647,405. In this microstructure, submicronic boride is distributed in intimate wetting contact with the surfaces of alumina agglomerates. This material shows promise for use in the environment of an aluminum production cell but the manufacture of large components is expensive.

A hard, dense refractory vitrified composition consisting of alumina with aluminum nitride is known from U.S. Pat. 2,480,475. Such material is non-wettable by molten aluminum, and its use is, therefore, limited. Another hard material proposed in French Patent Application 7613195 for abrasive applications is a composite of silicon carbide in fused alumina. This material is also non-wettable by molten aluminum and cannot be used in applications where such wettability is a requirement.

Various electrically-conductive composites composed of an electrically conductive matrix (such as graphite with pitch and other binders) including particles of RHM are also known, e.g., from U.S. Pat. Nos. 3,661,736, 4,376,029, 4,465,581, 4,466,996, as well as from WO 83/04271 and WO 84/02930. These materials are intended mainly as a replacement of the conventional current-carrying carbon lining of aluminum production cells, but so far have not found acceptance.

It has also been proposed to cover the carbon bottom of Hall-Heroult cells with tiles or slabs of RHM such as $TiB_2$. For example, U.S. Pat. No. 4,231,853 discloses fixing $TiB_2$ files loosely on pins. However, the cost of $TiB_2$ tiles is high and attaching the tiles to the bottom involves difficulties.

The aluminum production cell described in U.S. Pat. No. 4,383,910 employs a carbon cell bottom from which $TiB_2$ tiles project upwardly to form the cathode surface. On the cell bottom, surrounding the tiles, is a layer of solid cryolite/alumina which protects the carbon bottom from attack by molten aluminum. Again, this cell has not proven to be practical.

DISCLOSURE OF INVENTION

This invention is based on the insight that if alumina (or other suitable ceramic oxycompounds) could adequately be rendered wettable by molten aluminum, without simultaneously seeking to make them serve as current feeders, and if such wettability could be maintained permanently and at moderate cost, the material would be ideal as a non-current carrying component of an aluminum production cell in particular as a non-conductive cell bottom. Such a wettable, non-conductive cell bottom could be covered by a relatively shallow pool of aluminum forming the cathode, thereby alleviating the undesirable wave motion effect described above.

As set out in the claims, the invention provides an aluminum-wettable composite material characterized in that it comprises a body of fused alumina or other refractory oxycompound and a multiplicity of discrete inclusions of aluminum-wettable RHM in the surface of the body, there being fused alumina or other refractory oxycompound separating the RHM inclusions.

The material according to the invention can be conveniently manufactured in the form of slabs, bricks or pieces of other shapes by casting techniques as set out below. For most applications, the RHM inclusions need only be present on one face of the slab, brick or other shape of material. Thus, in preferred embodiments, the RHM inclusions are located solely at the surface of the material whereas the inside and the rest of the material can be made of solid fused alumina or other refractory oxycompounds. Other less preferred embodiments incorporate some inclusions also in the body of the material, preferably in low concentration since they add to the cost of the material without improving its surface wettability.

The amount and general distribution of the RHM inclusions over the surface will depend on the intended application and the required degree of wettability. For most applications, 20–90% and more preferably 30–80% of the projected area of the surface of the material may be taken up by the discrete RHM inclusions.

For cost reasons, it is advantageous to use RHM inclusions of random shapes and dimensions, because these can be manufactured much more inexpensively. Thus, the inclusions can be pieces of RHM in the form of irregular lumps or flakes. However, it is equally possible to use regular shapes such as balls, cones, small cylinders, or plates of various shapes such as hexagons, rings or star shapes. As a general rules the diameter or maximum transverse dimension of the inclusions will be in the range of 1–25 mm, mostly in the range 2–15 mm. However, it is also possible to produce fused bodies containing inclusions of RHM powder with an average particle size as low as 50 micron. When irregular shapes and sizes are used, the average transverse dimension of the inclusions will usually be in the same ranges. As various shapes and sizes of RHM materials and mixtures of RHM materials of different shapes and sizes can be used, the given dimension ranges should be regarded as a general guidance only.

The inclusions may be flush with the surface or the body. e.g., when the surface is machined. This is particularly suitable for applications where the material is used as a drained cathode covered only by a very thin film of molten aluminum. For applications where the material is in contact with a shallow pool of aluminum, say 5–30 mm thick, some or all of the RHM inclusions can protrude slightly from the alumina or other refractory oxycompound at the surface of the material.

The spacing and distribution of the inclusions can be non-uniform/random or in a pattern. Generally, all of the inclusions will be separated from one another but, depending on the manufacturing process, some pieces of the RHM may touch or cluster together. When the material is designed for applications where surface conductivity of the material is not required or may be detrimental, obviously the RHM inclusions should not touch in lined-up formation to form a current-carrying path. In such cases, essentially all or preferably at least 50% of the inclusions are electrically insulated from one another by the refractory oxycompound.

As stated above, for most applications, it is not necessary to have the RHM inclusions on the surface in touching contact with one another. However, where limited surface conductivity of the material is not a disadvantage, the inclusions can touch one another. This can be achieved by casting with pieces of $TiB_2$ packed in a monolayer or in a packed multilayer. This is also suitable when fine RHM powders are cast into the surface of a fused ceramic body. It is also possible by lining up the inclusions to provide surface conductivity along a given direction. These fused bodies incorporating a packed surface layer of RHM inclusions can of course be used to advantage in applications where both surface wettability by aluminum and surface conductivity are required. In other embodiments, it is possible to arrange for conductivity through the body via the RHM inclusions, with or without surface conductivity as well. Nevertheless, the presently preferred embodiments are bodies that are surface wettable by molten aluminum but which bodies are non-conductors (on the surface and through the body). Such bodies can be used to great advantage in aluminum production cells as non-current carrying but aluminum wettable components.

Titanium diboride is the preferred RHM on account of its excellent wettability and corrosion resistance to molten aluminum and molten cryolite. However, composite materials including $TiB_2$ are also contemplated, e.g., the $Al_2O_3.TiB_2$ composite described in U.S. Pat. No. 4,647,405. For example, pieces of this material can be made by reaction sintering. This material can then be machined or broken into smaller pieces of desired shapes, which are included in the fused alumina composite materials of this invention.

When alumina is chosen as the ceramic oxycompound phase of the composite material, use will preferably be made of the usual grades of highly-purified calcined alumina powder as currently used in aluminum electrowinning where this powder is added directly to the molten bath. Use can also be made of highly pure white fused alumina with an $Al_2O_3$ content of 98.5 to 99.5%, and in some cases the less pure grades of regular fused alumina (94 to 96% $Al_2O_3$) and semi-friable fused alumina (96 to 98% $Al_2O_3$).

Other ceramic aluminum, oxycompounds useful in the practice of the invention are the aluminates of lithium, sodium, potassium, beryllium, magnesium, calcium, strontium, barium, scandium, yttrium, lanthanum, hafnium, cerium, neodynium, samarium, ytterbium, thorium and other rare earths. Specific examples are the perovskite $Y_2O_3.Al_2O_3$ and the garnet $3Y_2O_3.5Al_2O_3$. Another useful aluminum oxycompound for cathode applications is aluminum oxynitride.

Other useful ceramic oxycompound materials include the $MgO.MgAl_2O_4$ refractories which have an optimum composition of 30–40 w % alumina and 60–70% MgO. Generally, MgO, CaO and $Ca_2F$ are desirable components of the oxycompounds. Oxyfluorides are also particularly suitable for applications of the material in aluminum production cells. As a general requirement, the refractory oxycompound material must fuse below the fusion point of the selected RHM.

The composite materials according to the invention can be easily manufactured by casting for example fused alumina or fused alumina-magnesia. The casting method involves distributing pieces or a coarse or fine powder of RHM in a mold, casting molten refractory oxycompound into the mould and allowing the molten oxycompound to solidify into a body containing discrete RHM inclusions which extend to the surface of the body.

Typically, in the production by fusion casting, the pieces or powders of RHM are distributed on the bottom of a suitable mold, e.g., of graphite. Then molten alumina or another suitable refractory oxycompound is poured in. The temperature of the melt is well below the fusion point of the RHM. After cooling, the inclusions of RHM are present at one surface of the resulting body. If necessary or desired, this surface can be machined to provide an optimum exposure of the RHM.

The RHM pieces can be a monolayer on the bottom of the mold, spaced apart from one another or in touching relationship, or may occupy a greater depth, for instance packed layers. Powders can be arranged in a layer of any suitable depth.

Another aspect of the invention is an aluminum reduction cell comprising a component having an aluminum-wettable surface in contact with molten aluminum in operation of the cell, characterized in that the component comprises a body of fused refractory oxycompound the surface of which is rendered wettable by molten aluminum by inclusions of RHM in the surface separated by the fused oxycompound.

Advantageously, these materials are used as aluminum-wettable but non-current carrying components. Such components include cell floors, walls, baffles, weirs, divider walls or packing elements, e.g., for use in the packed cathode bed described in European Patent EP-B-0 033 630. previous attempts to use RHM materials as components of aluminum-production cells have been mainly as current-carrying components such as cathode current feeders or conductive cell base linings. Aside from cost which has been a major obstacle to their use, the materials have often failed to meet up to multiple stringent requirements including conductivity, wettability, resistance to the cell environment and fixing in place. By eliminating the current-carrying requirement and by securely fixing the RHM inclusions in the cast matrix, the materials according to the invention are able to provide excellent wettability at reduced cost by making effective use of the wettable surfaces of the inclusions.

BRIEF DESCRIPTION OF DRAWINGS

The invention will be further described with reference to the accompanying schematic drawings, in which.

DESCRIPTION OF PREFERRED EMBODIMENTS

Figure 1:
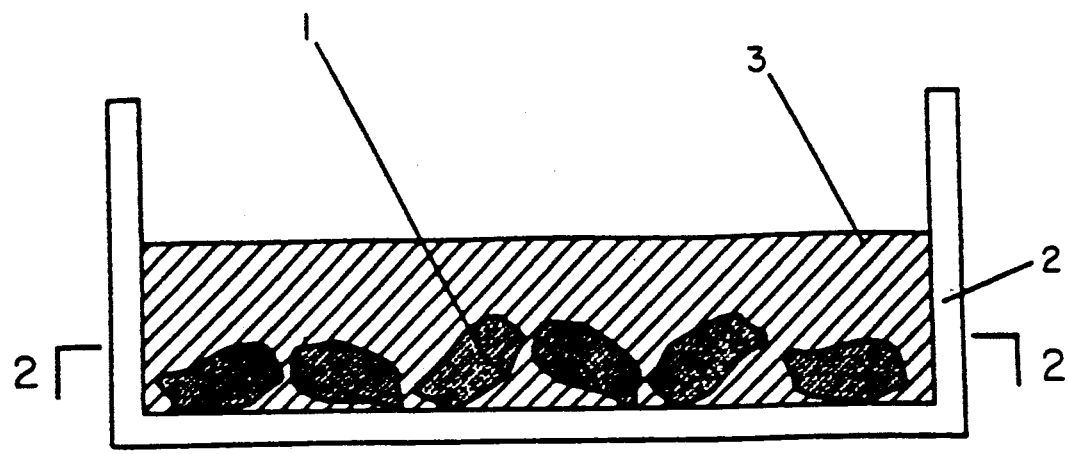
FIG. 1 is a schematic illustration showing the manufacture of a fused alumina/TiB$_2$ composite by casting.
Figure 2:
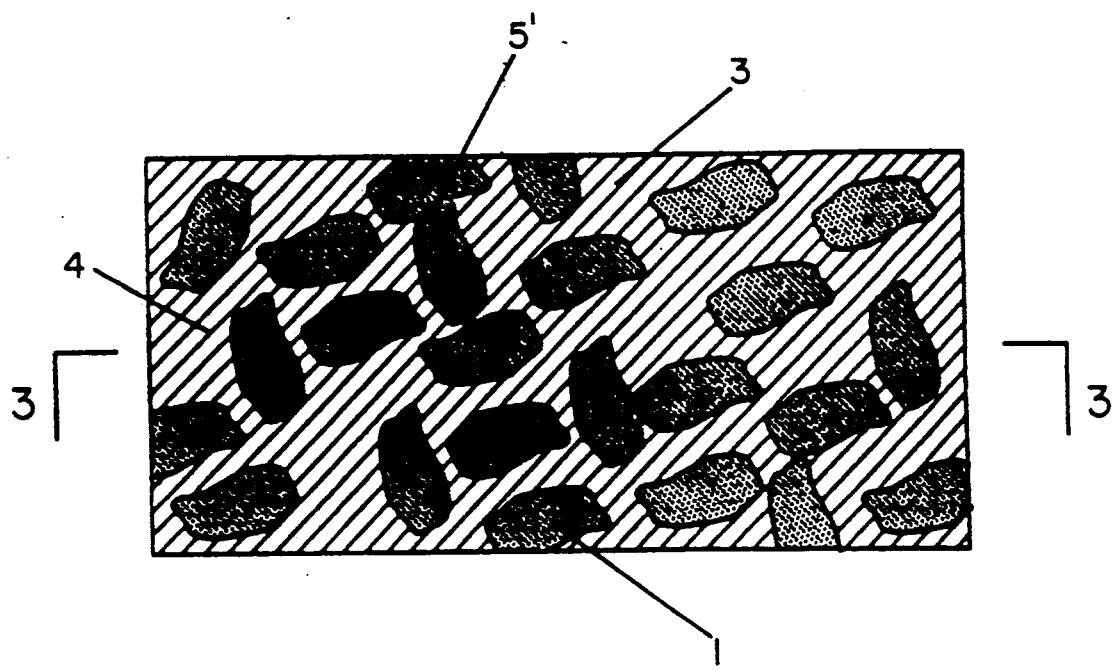
FIG. 2 is a top plan view of this fused alumina TiB$_2$ composite after machining its surface along line II—II of FIG. 1.
Figure 3:
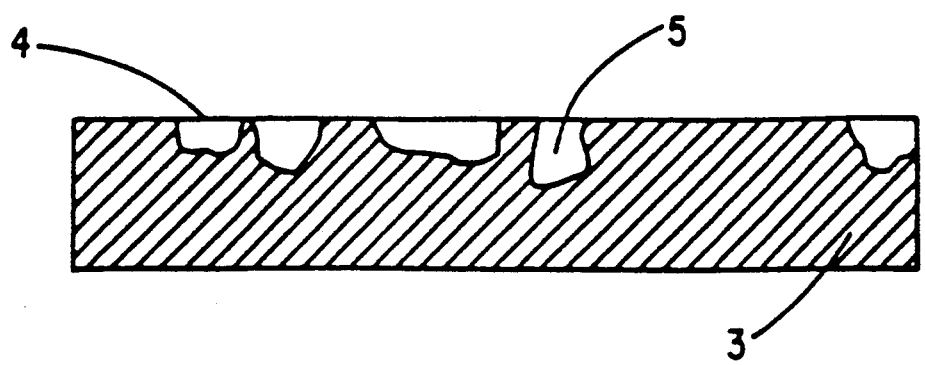
FIG. 3 is a cross-section along line III—III of FIG. 2.

FIG. 1 illustrates the production of a block of TiB$_2$/alumina by casting.

Lumps 1 of TiB$_2$ are scattered on the bottom of a mold 2, conveniently made of graphite. The mold 2 is surrounded by an annealing powder, not shown. The TiB$_2$ lumps 1 are of irregular shapes. Their average transverse dimension is conveniently in the range 3-30 mm with no lumps bigger than 50 mm or smaller than 1 mm. The lumps 1 are arranged so that they form a monolayer on the bottom of the mold, and for the most part are not in touching relationship with one another.

Alumina is melted in an electric arc furnace and poured into the graphite mold 2 to fill it to the required level with alumina 3.

After cooling and removal from the mold 2, the surface of the block of fused alumina containing the lumps 1 is machined flat along line II—II. The exposed, flat with surface 4. These TiB$_2$ inclusions 5 are randomly distributed over the flat fused alumina surface. Most inclusions 5 are entirely separate from one another, but a small number may touch, as at 5'.

Figure 4:
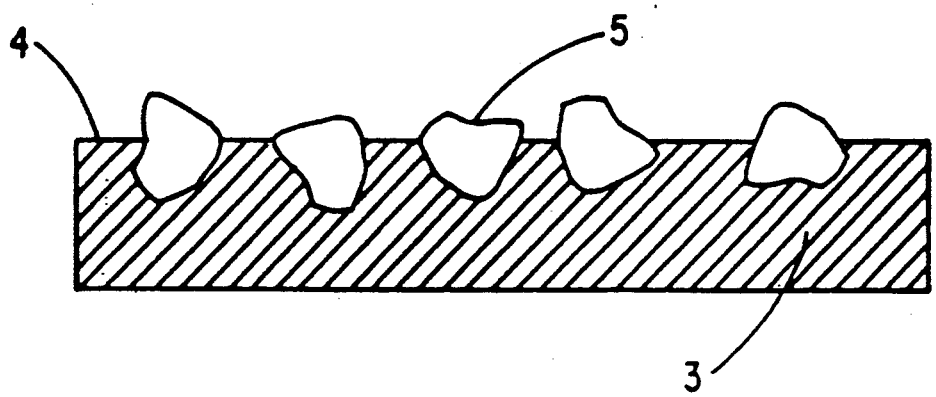
FIGS. 4, 5, 6, 7 and 8 are views similar to FIG. 3 of different composite materials according to the invention.
Figure 5:
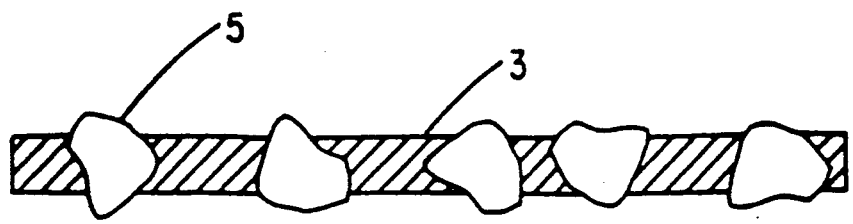

FIGS. 4 and 5 show alternative forms of the composite material.

In FIG. 4, the TiB$_2$ inclusions 5 protrude from the surface 4. This can be achieved by pressing the TiB$_2$ lumps into the surface of the mould 2 before casting the molten alumina.

In FIG. 5 the fused alumina is made into a thinner sheet so that the inclusions 5 extend to both surfaces. There are no paths for electrical current in the plane of the sheet, but the TiB$_2$ inclusions provide for conductivity through the sheet, generally perpendicular to the plane of the sheet.

Figure 6:
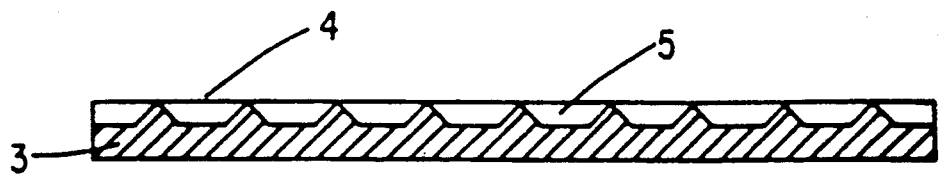

The material illustrated in FIG. 6 has inclusions 5 of regular truncated conical shape in side-by-side touching relationship on one face of the body. The larger faces of the truncated cones face outwards. These pieces are laid flat on the bottom of the mould, so that the FIG. 6 form may be obtained without further machining.

Figure 7:
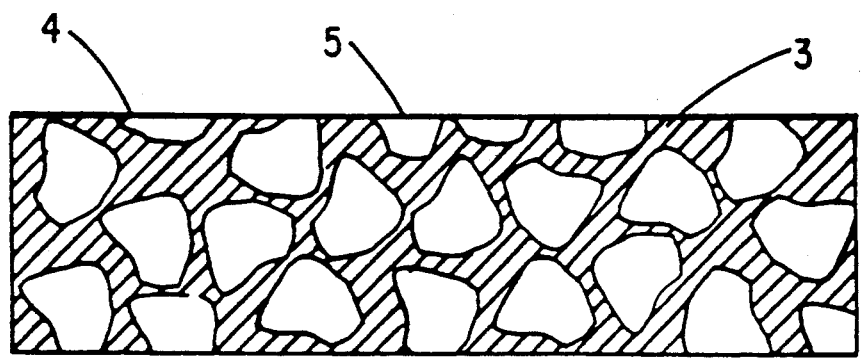

FIG. 7 shows a material in which irregular pieces 5 of RHM are packed into the mould. After casting the alumina and cooling, one face 4 is machined to maximize the accessible TiB$_2$ surfaces. This body is electrically conductive in all directions.

Figure 8:
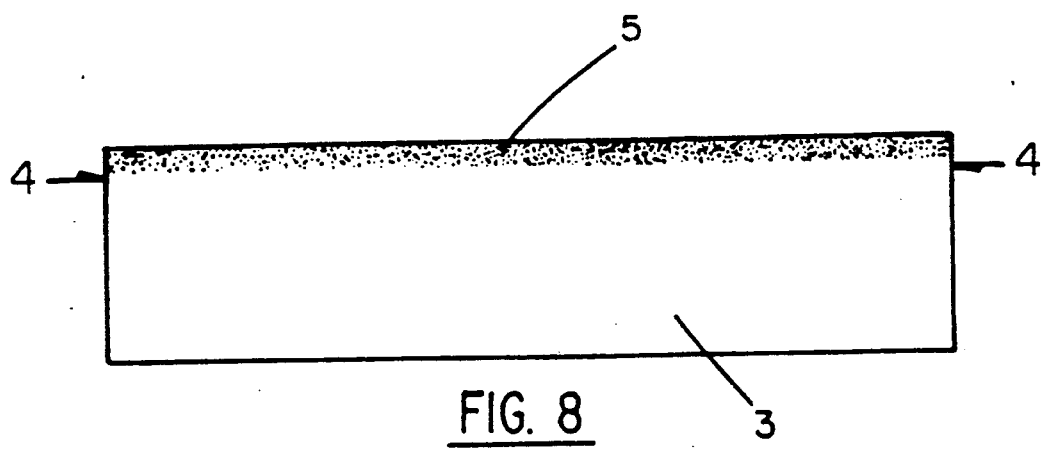

FIG. 8 shows a material in which several layers of powder inclusions, e.g., a powder of average diameter from 50 micron to 1 mm packed to a depth of 200 micron to 2.5 mm, are embodied in the surface of a body of fused alumina 3 by the technique described in connection with FIG. 1. After casting, the body can be machined along line IV—IV to maximize the surface of the wettable RHM.

I claim:

1. An aluminum-wettable refractory oxycompound-/Refractory Hard Metal composite material characterized in that said composite material comprises a solid body consisting of fused refractory oxycompound cast as a solid block having a multiplicity of discrete lumps or pieces of aluminum-wettable Refractory Hard Metal cast in a surface of the block, the Refractory Hard Metal lumps or pieces being separated by the fused refractory oxycompound of the solid block.

2. The composite material of claim 1, in the form of a slab having lumps or pieces in only one face thereof.

3. The composite material of claim 1, in which 20-90% of the projected area of the surface of the material is occupied by the lumps or pieces.

4. The composite material of claim 1, in which the lumps or pieces are irregular in shape.

5. The composite material of claim 1, in which the maximum transverse dimension of the lumps or pieces is in the range 50 micrometer to 50 mm.

6. The composite material of claim 1, in which the lumps or pieces are flush with the surface of the material.

7. The composite material of claim 1, in which at least some of the lumps or pieces protrude from the surface of the material.

8. The composite material of claim 1, in which at least 50% of the lumps or pieces electrically insulated from one another by the refractory oxycompound.

9. The composite material of claim 1, comprising at

10. The composite material of claim 1, in which the ceramic oxycompound is alumina.

11. The composite material of claim 1, in which the Refractory Hard Metal is $TiB_2$.

12. An aluminum production cell containing an aluminum-wettable composite material of claim 1, as a component of said aluminum production cell in contact with molten aluminum.

13. An aluminum reduction cell comprising a component having an aluminum-wettable surface in contact with molten aluminum during operation of the cell and which does not serve to conduct electric current, characterized in that the component comprises a solid body consisting of fused refractory oxycompound cast as a solid block having a multiplicity of discrete lumps or pieces of aluminum-wettable Refractory Hard Metal cast in aluminum wettable the surface of the block, the Refractory Hard Metal lumps or pieces being separated by fused refractory oxycompound, the surface of said block being rendered wettable by molten aluminum by said discrete lumps or pieces of Refractory Hard Metal.

* * * * *